(12) United States Patent
Yaeger

(10) Patent No.: US 10,599,470 B1
(45) Date of Patent: *Mar. 24, 2020

(54) CLOUD THREAD SYNCHRONIZATION

(71) Applicant: OPEN INVENTION NETWORK LLC, Durham, NC (US)

(72) Inventor: Marc Todd Yaeger, Hoover, AL (US)

(73) Assignee: OPEN INVENTION NETWORK LLC, Durham, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/149,404

(22) Filed: Oct. 2, 2018

Related U.S. Application Data

(63) Continuation of application No. 15/346,207, filed on Nov. 8, 2016, now Pat. No. 10,089,141, which is a continuation of application No. 13/800,241, filed on Mar. 13, 2013, now Pat. No. 9,495,198.

(60) Provisional application No. 61/683,936, filed on Aug. 16, 2012.

(51) Int. Cl.
*G06F 9/48* (2006.01)
*G06F 9/52* (2006.01)
*G06F 9/46* (2006.01)

(52) U.S. Cl.
CPC .............. *G06F 9/4843* (2013.01); *G06F 9/46* (2013.01); *G06F 9/52* (2013.01)

(58) Field of Classification Search
CPC .................................................... G06F 9/4843
See application file for complete search history.

(56) References Cited

U.S. PATENT DOCUMENTS

| | | | |
|---|---|---|---|
| 6,892,210 B1 * | 5/2005 | Erickson | ................. G06F 16/27 |
| 8,429,675 B1 | 4/2013 | Radhakrishnan et al. | |
| 2005/0262313 A1 | 11/2005 | Holt | |
| 2011/0161540 A1 * | 6/2011 | Chang | ..................... G06F 9/526 |
| | | | 710/200 |

\* cited by examiner

*Primary Examiner* — Sisley N Kim

(57) ABSTRACT

A system, apparatus, and method for thread synchronization is provided. In one embodiment, a network system receives a signal from a first computing machine, and determines whether one or more processes are waiting for the signal. The network system also transmits the signal to one of the one or more processes on the first computing machine or a second computing machine to execute a thread of the process.

20 Claims, 4 Drawing Sheets

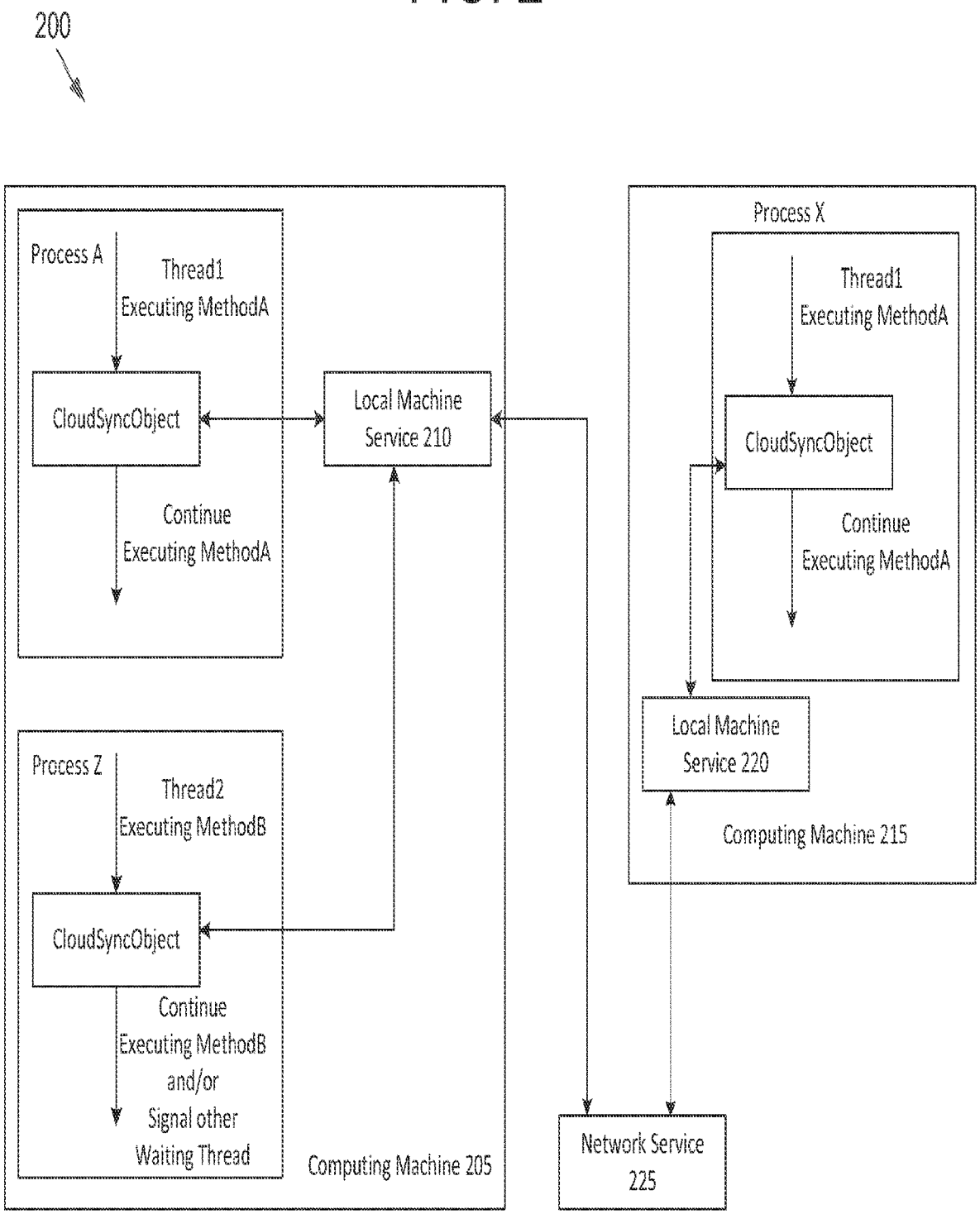

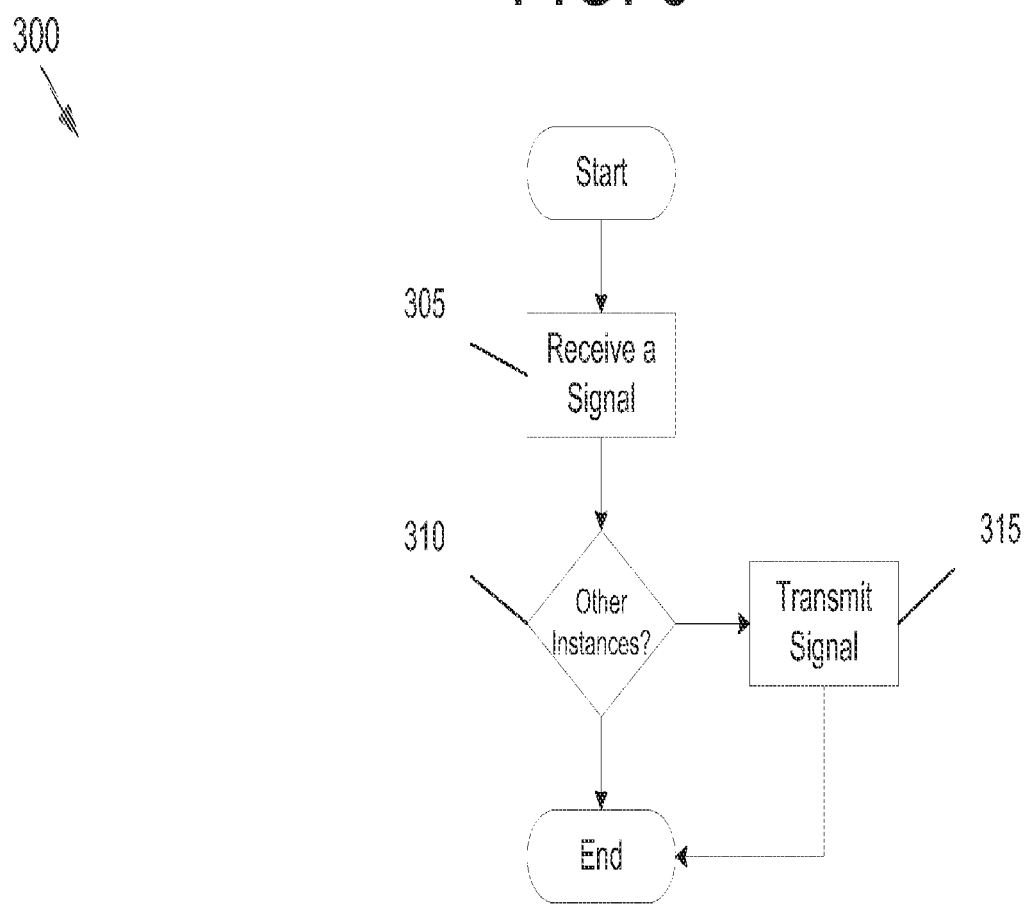

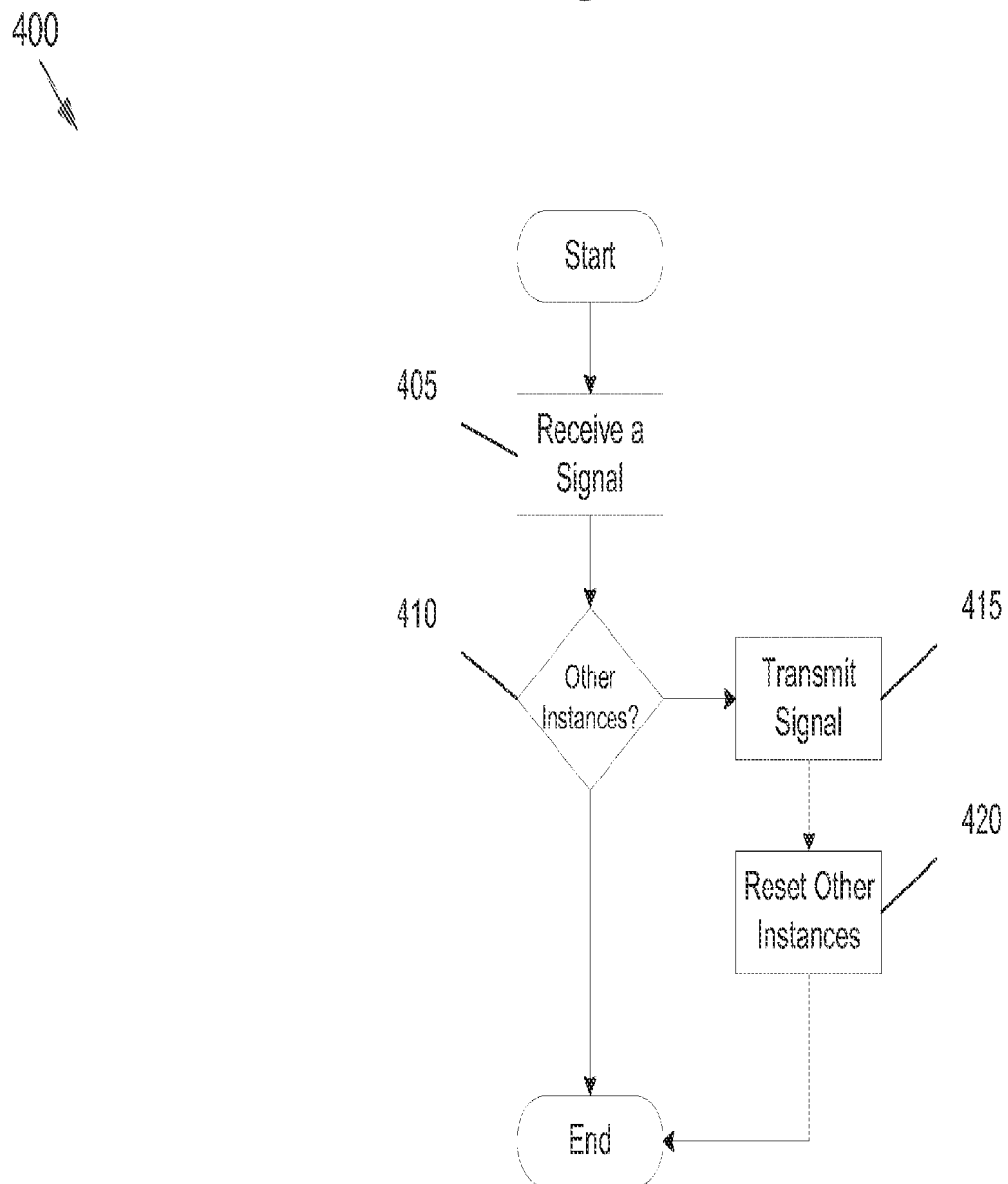

CLOUD THREAD SYNCHRONIZATION

CROSS-REFERENCE TO RELATED APPLICATION

This application is a continuation of U.S. application Ser. No. 15/346,207, filed on Nov. 8, 2016, entitled CLOUD THREAD SYNCHRONIZATION, issued as U.S. Pat. No. 10,089,141 on Oct. 2, 2018, which is a continuation of U.S. application Ser. No. 13/800,241, filed on Mar. 13, 2013, entitled CLOUD THREAD SYNCHRONIZATION, issued as U.S. Pat. No. 9,495,198 on Nov. 15, 2016, which claims the benefit of U.S. Provisional Patent Application No. 61/683,936, filed on Aug. 16, 2012. The subject matter of the above applications is hereby incorporated by reference in its entirety.

FIELD

The present invention relates to thread synchronization and, more particularly, to thread synchronization across a plurality of computing machines.

BACKGROUND

One of the issues with cloud data is how to control who can access and modify the cloud data. This is not unlike multithreading issues with a shared resource or piece of data, hence the reason for thread synchronization. Accordingly, a multithreading approach to cloud synchronization may be beneficial.

SUMMARY

Certain embodiments of the present invention may provide solutions to the problems and needs in the art that have not yet been fully identified, appreciated, or solved by current thread synchronization systems. In one embodiment, a thread on a machine may have sole access to a piece of cloud data. Once the thread is finished with the cloud data, another thread on the same machine or a different machine can then access and/or modify the data.

In accordance with an embodiment of the present invention, a computer-implemented method is provided. The computer-implemented method includes receiving, at a network system, a signal from a first computing machine, and determining whether one or more processes are waiting for the signal. The computer-implemented method also includes transmitting the signal to one of the one or more processes on the first computing machine or a second computing machine to execute a thread of the process.

In another embodiment of the present invention, a system is provided. The system includes a network system that includes at least one processor. The network system receives a signal from a first computing machine, and determines whether one or more processes are waiting for the signal. The network system also transmits the signal to one of the one or more processes on the first computing machine or a second computing machine to execute a thread of the process.

In yet another embodiment of the present invention, a system is provided. The system includes a network system that includes at least one processor. The network system is configured to receive a signal from a process of a first computing machine, and determine available local machine services on the first computing machine and other computing machines in the system. The network system is also configured to transmit the signal to the available local machine services.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which:

FIG. 2 illustrates a block diagram of a cloud thread synchronization system, according to an embodiment of the present invention.

FIG. 3 illustrates a flow diagram of a single notification process, according to an embodiment of the present invention.

FIG. 4 illustrates a flow diagram of a multi-notification process, according to an embodiment of the present invention.

DETAILED DESCRIPTION OF THE EMBODIMENTS

Figure 1:
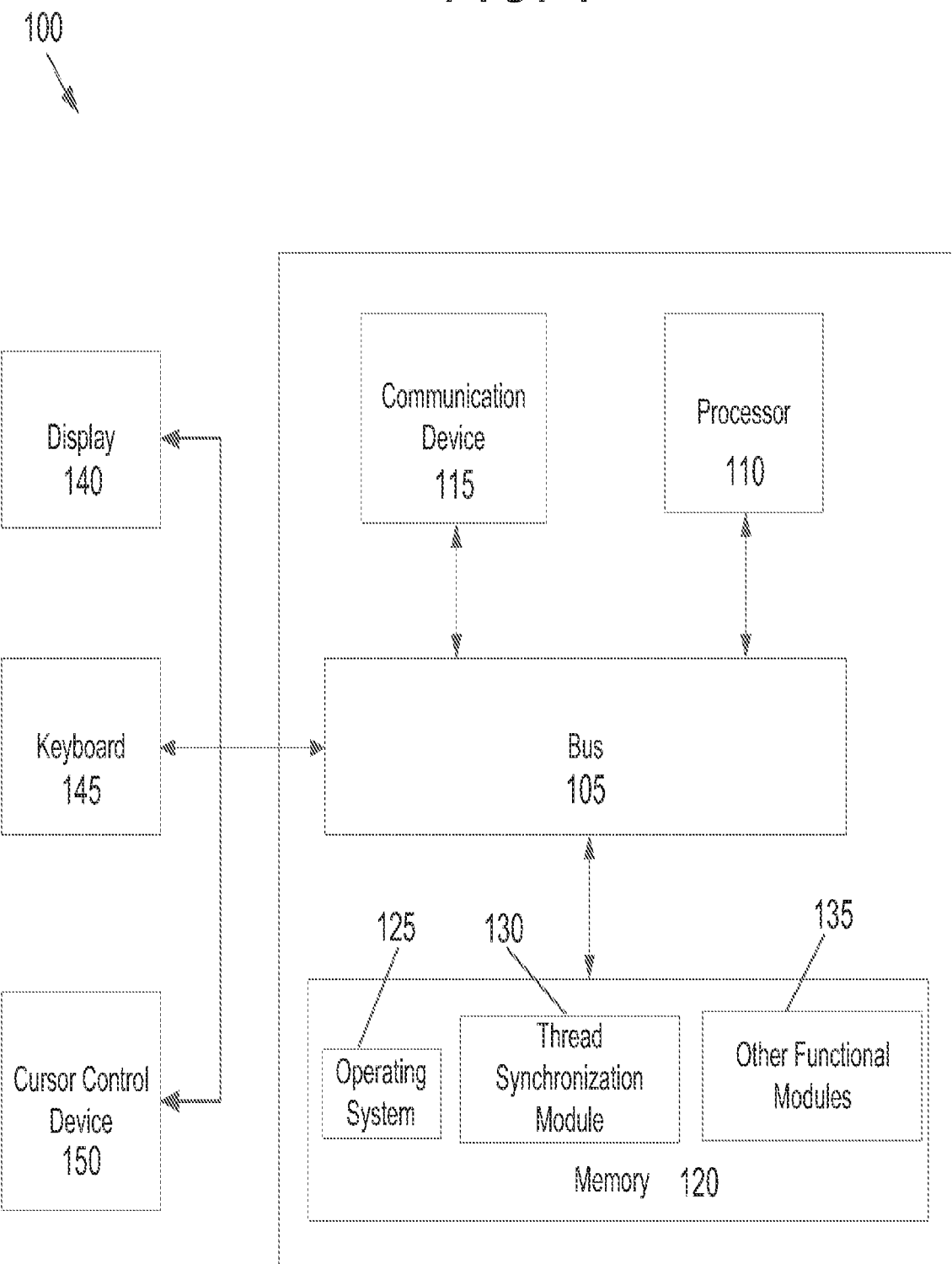
FIG. 1 illustrates a block diagram of a computing system, according to an embodiment of the present invention.

One or more embodiments of the present invention synchronize threads across different computing machines to protect cloud data. Stated differently, a thread can send and receive a signal from another thread on a different computing machine. This enables developers to write thread synchronization code that is similar to current thread synchronization code, but synchronizes threads across machines. Embodiments described herein may use single thread or multiple thread signaling much like manual or auto reset modes for event wait handles in Microsoft Windows®.

FIG. 1 illustrates a block diagram of a computing system 100, according to an embodiment of the present invention. System 100 may include a bus 105 or other communication mechanism that can communicate information and a processor 110, coupled to bus 105, that can process information. Processor 110 can be any type of general or specific purpose processor. System 100 may also include memory 120 that can store information and instructions to be executed by processor 110. Memory 120 can be comprised of any combination of random access memory ("RAM"), read only memory ("ROM"), static storage such as a magnetic or optical disk, or any other type of computer readable medium. System 100 may also include a communication device 115, such as a network interface card, that may provide access to a network.

The computer readable medium may be any available media that can be accessed by processor 110. The computer readable medium may include both volatile and nonvolatile media, removable and non-removable media, and communication media. The communication media may include computer readable instructions, data structures, program modules, or other data and may include any information delivery media.

Processor 110 can also be coupled via bus 105 to a display 140, such as a Liquid Crystal Display ("LCD"). Display 140 may display information to the user, such as data stored on a network. A keyboard 145 and a cursor control unit 150, such as a computer mouse, may also be coupled to bus 105 to enable the user to interface with system 100.

According to one embodiment, memory 120 may store software modules that may provide functionality when executed by processor 110. The modules can include an operating system 125 and a thread synchronization module 130, as well as other functional modules 135. Operating system 125 may provide operating system functionality for system 100. Because system 100 may be part of a larger system, system 100 may include one or more additional functional modules 135 to include the additional functionality.

One skilled in the art will appreciate that a "system" could be embodied as a personal computer, a server, a console, a personal digital assistant ("PDA"), a cell phone, a tablet computing device, or any other suitable computing device, or combination of devices. Presenting the above-described functions as being performed by a "system" is not intended to limit the scope of the present invention in any way, but is intended to provide one example of many embodiments of the present invention. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, RAM, tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

FIG. 2 illustrates a block diagram of a cloud thread synchronization system 200, according to an embodiment of the present invention. In this embodiment, computing machines 205, 215 may access a network service (or network system) 225. It should be appreciated, however, that some embodiments may include one or more computing machines accessing network service 225 at any given time, and any number of computing machines may be present in some embodiments.

In certain embodiments, one or more processes may be running on computing machines 205, 215, and may access data stored on network service 225 via a respective local machine service 210, 220. For example, if a first process is accessing data on network service 225, then other processes running on computing machines 205, 215 may wait for a signal from respective local machine service 210, 220 before accessing the data.

Single Notification Process (Cloud Auto Reset Event)

In this embodiment, a cloud synchronization object call of Thread1 of process A transmits a signal to local machine service 210, similar to auto reset and/or manual event wait handles in Windows®. Local machine service 210 may look for other cloud synchronization object calls waiting for this signal based on an instantiation of a cloud synchronization object registered with local machine service 210. In this example, Thread2 of process Z is required to wait.

If there is a thread waiting on computing machine 205, such as Thread2 of the Process Z, then that thread may receive a signal using a cloud synchronization object call and continue processing. No other threads either locally or on the network will be signaled in such an embodiment.

In another embodiment, if there are no other cloud synchronization object calls waiting locally on computing machine 205, local machine service 210 transmits a signal to network service 225. Network service 225 may determine whether there are any instances on other local machine services waiting for a signal. For example, if there is an instance running (e.g., Process X) on computing machine 215, network service 225 transmits a signal to local machine service 220 of computing machine 215.

Local machine service 220 receives the signal from network service 225, and signals a waiting thread (e.g., Thread2 of Process X) using a cloud synchronization object call. Thread2 of Process X, for example, upon receipt of the signal, may begin to process data on the network.

Multi-Notification Process (Cloud Manual Reset Event)

In this embodiment, a cloud synchronization object call on Thread1 of Process A transmits a signal to local machine service 210. Local machine service 210 may determine whether other cloud synchronization objects are waiting for the signal from Thread1 of Process A based on an instantiation of a cloud synchronization object call registered with local machine service 210. In this embodiment, Thread2 of Process Z may have to wait until it receives a signal from local machine service 210.

Local machine service 210 may transmit a signal to network service 225. Network service 225 may determine whether local machine services 210, 220 are waiting for a signal, and transmit the signal accordingly. Each local machine service 210, 220, upon receipt of the signal, notifies each cloud synchronization object to continue execution of the process.

It should be noted that any cloud synchronization object, both locally and on the network, may receive the signal to continue. In this instance, any of the threads (locally and on the network) can reset the cloud synchronization object to an unsignalled state. This may cause any other cloud synchronization objects to wait.

FIG. 3 illustrates a flow diagram 300 of a single notification process, according to an embodiment of the present invention. The process begins at 305 with a network service receiving a signal from a process of a first computing device (i.e., computing machine). The network service determines at 310 whether other instances are waiting for the signal on another computing device. If there are no other instances, then the process terminates. If there are other instances, then the network service transmits at 315 the signal to a first instance on the other computing device.

FIG. 4 illustrates a flow diagram 400 of a multi-notification process, according to an embodiment of the present invention. The process begins at 405 with a network service receiving a signal from a process of a first computing device. The network service then determines at 410 whether other instances are waiting for the signal on other computing devices. If there are no other instances, then the process terminates. If there are other instances, then the network service transmits at 415 the signal to the other instances on the other computing devices. At 420, instances on the other computing devices can be reset to an unsignalled state, such that a first instance of the other instances can execute a thread.

The method steps shown in FIGS. 3 and 4 may be performed, in part, by a computer program, encoding instructions for a nonlinear adaptive processor to cause at least the methods described in FIGS. 3 and 4 to be performed by the apparatuses discussed herein. The computer program may be embodied on a non-transitory computer readable medium. The computer readable medium may be, but is not limited to, a hard disk drive, a flash device, a random access memory, a tape, or any other such medium used to store data. The computer program may include encoded instructions for controlling the nonlinear adaptive processor to implement the methods described in FIGS. 3 and 4, which may also be stored on the computer readable medium.

The computer program can be implemented in hardware, software, or a hybrid implementation. The computer program can be composed of modules that are in operative communication with one another, and which are designed to pass information or instructions to display. The computer program can be configured to operate on a general purpose computer, or an application specific integrated circuit ("ASIC").

It will be readily understood that the components of the invention, as generally described and illustrated in the figures herein, may be arranged and designed in a wide variety of different configurations. Thus, the detailed description of the embodiments is not intended to limit the scope of the invention as claimed, but is merely representative of selected embodiments of the invention.

The features, structures, or characteristics of the invention described throughout this specification may be combined in any suitable manner in one or more embodiments. For example, the usage of "certain embodiments," "some embodiments," or other similar language, throughout this specification refers to the fact that a particular feature, structure, or characteristic described in connection with an embodiment may be included in at least one embodiment of the invention. Thus, appearances of the phrases "in certain embodiments," "in some embodiments," "in other embodiments," or other similar language, throughout this specification do not necessarily all refer to the same embodiment or group of embodiments, and the described features, structures, or characteristics may be combined in any suitable manner in one or more embodiments.

One having ordinary skill in the art will readily understand that the invention as discussed above may be practiced with steps in a different order, and/or with hardware elements in configurations that are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A method, comprising:
   receiving, at a local machine service of a first computing machine comprising at least one processor, at least one memory, a bus for internal communication on the first computing machine and at least one communication device for external communication of the first computing machine to an external network system, a signal from a thread of a first process executing on the first computing machine that has sole access to data on a network service of the external network system;
   transmitting, from the local machine service of the first computing machine, the signal to the at least one of the second processes where there are one or more waiting second processes executing on the first computing machine;
   transmitting, from the local machine service of the first computing machine, the signal to the external network system when the local machine service determines no processes are waiting locally on the first computing machine;
   determining whether one or more processes are waiting for the signal to access the data on a second computing machine; and
   transmitting, from the external network system, the signal to one of the one or more processes waiting on the second computing machine to execute a thread of the one or more processes using the data on the network service.

2. The method of claim 1, comprising determining, by the local machine service of the first computing machine, whether the one or more second processes executing on the first computing machine are waiting for the signal.

3. The method of claim 1, wherein the determining, by the local machine service, whether the one or more second processes are waiting for the signal to access the data is based on an instantiation of a cloud synchronization object registered with the local machine service.

4. The method of claim 1, wherein the signal received from the thread of the first process executing on the first computing machine has sole access to the data.

5. The method of claim 1, further comprising receiving, at a local machine service of the second computing machine, the signal to execute a process waiting on the second computing machine.

6. The method of claim 5, further comprising transmitting, from the local machine service of the second computing machine, the signal to the process waiting on the second computing machine.

7. A non-transitory computer readable medium comprising instructions that, when read by a processor, cause the processor to perform:
   receiving, at a local machine service of a first computing machine comprising at least one processor, at least one memory, a bus for internal communication on the first computing machine and at least one communication device for external communication of the first computing machine to an external network system, a signal from a thread of a first process executing on the first computing machine that has sole access to data on a network service of the external network system;

transmitting, from the local machine service of the first computing machine, the signal to the at least one of the second processes where there are one or more waiting second processes executing on the first computing machine;

transmitting, from the local machine service of the first computing machine, the signal to the external network system when the local machine service determines no processes are waiting locally on the first computing machine;

determining whether one or more processes are waiting for the signal to access the data on a second computing machine; and transmitting, from the external network system, the signal to one of the one or more processes waiting on the second computing machine to execute a thread of the one or more processes using the data on the network service.

8. The non-transitory computer readable medium of claim 7 comprising instructions that, when read by the processor, cause the processor to perform determining, by the local machine service of the first computing machine, whether the one or more second processes executing on the first computing machine are waiting for the signal.

9. The non-transitory computer readable medium of claim 8, wherein the determining, by the local machine service, whether the one or more second processes are waiting for the signal to access the data is based on an instantiation of a cloud synchronization object registered with the local machine service.

10. The non-transitory computer readable medium of claim 8, wherein the signal received from the thread of the first process executing on the first computing machine has sole access to the data.

11. The non-transitory computer readable medium of claim 8 comprising instructions that, when read by the processor, cause the processor to perform receiving, at a local machine service of the second computing machine, the signal to execute a process waiting on the second computing machine.

12. The non-transitory computer readable medium of claim 11 comprising instructions that, when read by the processor, cause the processor to perform transmitting, from the local machine service of the second computing machine, the signal to the process waiting on the second computing machine.

13. A system, comprising:
a first computer machine and an external network system;
the first computer machine comprising at least one processor, at least one memory, at least one bus for internal communication on the first computing machine and at least one communication device for external communication of the first computing machine to the external network system, the at least one processor configured to:
receive, at a local machine service of a first computing machine, a signal from a thread of a first process executing on the first computing machine that has sole access to data on a network service of the external network system;
transmit, from the local machine service of the first computing machine, the signal to the at least one of the second processes where there are one or more waiting second processes executing on the first computing machine;
transmit, from the local machine service of the first computing machine, the signal to the external network system when the local machine service determines no processes are waiting locally on the first computing machine;
determine whether one or more processes are waiting for the signal to access the data on a second computing machine; and
the external network system comprising at least one processor and configured to transmit the signal to one of the processes waiting on the second computing machine to execute a thread of the one of the processes using the data on the network service.

14. The system of claim 13, wherein the local machine service of the first computing machine determines whether the one or more second processes executing on the first computing machine are waiting for the signal.

15. The system of claim 13, wherein the determining, by the local machine service, whether the one or more second processes are waiting for the signal to access the data is based on an instantiation of a cloud synchronization object registered with the local machine service.

16. The system of claim 13, wherein the signal received from the thread of the first process that executes on the first computing machine has sole access to the data.

17. The system of claim 13, comprising a local machine service of the second computing machine configured to receive the signal to execute a process on the second computing machine.

18. The system of claim 17, wherein the local machine service of the second computing machine is further configured to transmit the signal to the process waiting on the second computing machine.

19. The system of claim 13, wherein an instantiation for each of the one or more processes is registered.

20. The system of claim 19, wherein the instantiation for each of the one or more processes is registered with the local machine service.

* * * * *